ates Patent [19]

United States Patent [19]
Filler

[11] 3,930,401
[45] Jan. 6, 1976

[54] CONTAINER AND LEAK-TESTING SYSTEM THEREFOR

[76] Inventor: Harry H. Filler, 3713 Mount Diable Blvd., Lafayette, Calif. 94549

[22] Filed: Apr. 30, 1973

[21] Appl. No.: 355,908

[52] U.S. Cl. .................... 73/49.2; 73/45.3; 73/49.8
[51] Int. Cl.² ........................................ G01M 3/02
[58] Field of Search ............... 73/49.2, 49.3, 41, 45, 73/45.1, 45.2, 45.3, 46, 49.8, 37; 209/73; 220/24 A

[56] References Cited
UNITED STATES PATENTS

| | | | |
|---|---|---|---|
| 2,020,535 | 11/1935 | Cameron | 73/45.2 |
| 2,130,637 | 9/1938 | Darling | 220/24 A UX |
| 2,177,019 | 10/1939 | Egenolf | 73/45.3 |
| 3,595,065 | 7/1971 | Scribner | 73/37 |
| 3,762,213 | 10/1973 | Nowicki | 73/45.3 |

Primary Examiner—Richard C. Queisser
Assistant Examiner—Joseph W. Roskos
Attorney, Agent, or Firm—Theodore J. Bielen, Jr.; Richard Esty Peterson

[57] ABSTRACT

A system for testing opening-equipped containers for leakage during the entire period, which is usually relatively long, between the time that such containers are fabricated by the manufacturer thereof and the time that they are filled by the user with the product intended therefor. The system includes a testing method, a particular test closure or cap and structural relationship thereof with a container opening, and apparatus for establishing a pressure differential between the interior and exterior of any container under test. In the practice of such system, a pressure differential is established between the interior and exterior of the container, such as by vacuumizing the container interior; seating a closure cap of particular character against surfaces of the container in covering relation with the opening thereof, and sealingly relating the closure cap to the container and thereafter maintaining the sealing relationship therebetween using, in each instance, only the pressure differential as the seating and sealing force; transporting the sealed container from its place of fabrication to the place of use, either directly or with intermediate storage periods; and before the container is to be filled with a product, testing the tightness of the closure cap against the container as an index of the presence or loss of the pressure differential.

13 Claims, 4 Drawing Figures

CONTAINER AND LEAK-TESTING SYSTEM THEREFOR

This invention relates to the container art and, more particularly, to opening-equipped containers adapted to receive and sealingly confine products of various types therewithin. In still more particular reference, the invention relates to an opening-equipped container and test closure therefor; to a method of testing containers of such type for leakage; and to apparatus for use with such containers and closure caps to establish a pressure differential between the interior and exterior of any such container as a step in the testing method therefor.

Particular containers with which the invention has utility are metal containers used in the food and chemical industries, as well as elsewhere, for packaging products in a sealed condition for shipment and sale. As a specific example of such metal containers, both drums (usually 55 gallon) and pails may be connsidered, the latter being somewhat smaller counterparts of the former and usually ranging in size from about 5 to 20 gallons. Metal containers of this character are fabricated by separately forming and thereafter interconnecting a plurality of components, one thereof being a body tube or shell (which is usually but not necessarily cylindrical in cross section) formed from a flat steel sheet bent into a cylindrical configuration with the longitudinal edge portions thereof overlapped and welded together to sealingly constrain the sheet in its tubular form. Other components are the bottom and top walls, or ends, that are joined with the tube to establish a sealed mechanical interconnection therebetween. One of the walls is provided with an opening through which the product is subsequently removed by the ultimate purchaser. Depending somewhat upon the size of the container, such opening may be in the sidewall or in an end wall thereof.

It is common industry practice to test containers prior to shipment thereof by the manufacture to the user, and one of the tests often used requires pressurization of each container and then submerging the same in a liquid to observe for evidence of leakage or otherwise checking for loss of pressure from the container. Such tests are clearly cumbersome, require the container opening to be sealed and subsequently unsealed, and the short or restricted time interval practicably assigned to these tests requires exercise of care to discover minute leaks (sometimes referred to as "weepers") because of the slow rate of escape of air occasioned thereby.

In view of the foregoing, a general object of the present invention is to provide a system for effectively testing opening-equipped containers for leakage prior to products being packaged therein, and which system is effective to detect even minute leaks which heretofore have been difficult to detect.

Still another object of the invention is in the provision of an improved system of the character described that lends itself to use in commercial, large-scale production of metal containers and the like, that is relatively inexpensive yet reliable, and that enables the leakage test to be of long duration — possibly for weeks and months — without in any way interfering with normal schedules of production, shipment, storage and use.

Still another object is that of providing an improved system of the character described that includes a leakage-testing method, container and test-closure relationship, and apparatus for use in the testing method; and which system utilizes as the test interval substantially the entire long-time period between when the container is fabricated by the manufacturer and when it is subsequently filled by the user with the product intended therefor which, in the ordinary instance, follows transport of the container from the manufacturer to the location of the user and any intermediate storage time at either location.

Further objects, among others, of the present invention are to provide a system as described in which an opening-equipped container has a pressure differential established between the interior and exterior thereof; in which a test closure member constructed so as to fit loosely and with substantially no constraint within the opening of such container is seated in the opening in covering relation therewith and is sealingly related thereto and thereafter maintained in such relationship therewith entirely by the pressure differential existing between the interior and exterior of the container; in which the sealed container is then transported from its place of fabrication to its general place of use; and in which the condition of the container is then determined by testing the tightness of the closure member against the container as an index of any loss of the pressure differential, loss thereof being indicative of a leaking and therefore defective container.

Additional objects of the invention, especially as concerns particular features and characteristics thereof, will become apparent as the specification continues.

An embodiment of the invention is illustrated in the accompanying drawing, in which:

FIG. 1 is a broken vertical sectional view through the upper end portion of a container and closure member therefor embodying the present invention both shown in association with apparatus for establishing a pressure differential between the exterior and interior of the container, the relative positions of the cap-equipped container and apparatus depicting the first condition of the overall process;

Figure 1:
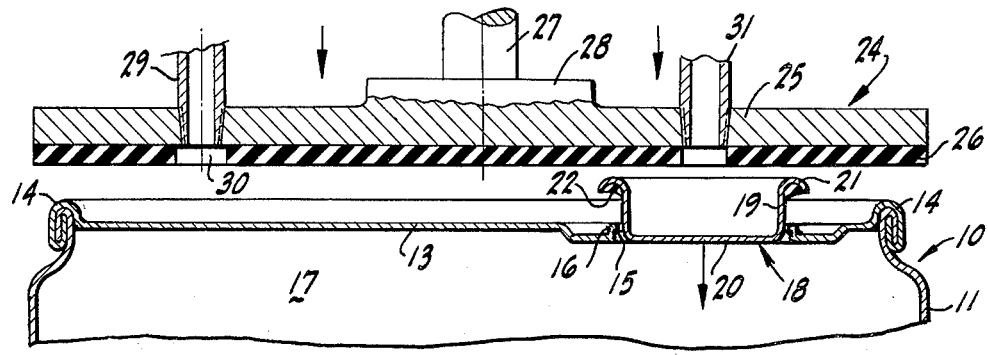

As previously suggested, the present invention is useful with a great variety of containers that are adapted to receive and thereafter sealingly confine products therewithin, and the container illustrated in the drawing is intended to be exemplary of such containers and is denoted in its entirety with the numeral 10. As respects the present invention, the container 10 may be completely conventional, and the particular container illustrated is a five-gallon, 24-gauge insecticide pail manufactured and sold by Rheem Manufacturing Company of Richmond, Calif. as a number 17E Insecticide Pail having a "Rieke Flex-Spout" opening. As stated, however, the container 10 is exemplary only because the invention is useful with a very great variety of opening-equipped containers adapted to have the openings thereof sealed with a closure member after a product has been placed within the interior thereof.

The particular container 10 illustrated has a generally cylindrical sidewall 11 equipped at the lower end thereof with a bottom wall 12 (FIG. 3) that is sealingly related thereto. Adjacent its upper end, the container 10 is equipped with a top wall 13 having an upwardly extending perimetric flange or rim 14 turned downwardly upon itself into an inverted generally U-shaped configuration by means of which it is sealingly connected with the upper edge of the sidewall 11. The generally planar portions of the top wall 13 are therefore inset below the upper edge of the lip 14, and at one location therealong, the top wall has an opening 15 therein defined by a substantially cylindrical rim or flange 16. The portions of the cover 13 immediately joining with the rim 16 are depressed so that the upper edge of the rim is spatially free from obstruction. The type of opening shown is sometimes referred to as a "reverse curl opening," but as previously emphasized, the particular container and precise character of the opening therein is not critical, and "regular curl openings" are another example of a type of opening with which the container may be equipped. The side, bottom, and top walls 13 define a hollow interior 17 adapted to receive a product which will be sealed within the container for shipment and storage.

Figure 3:
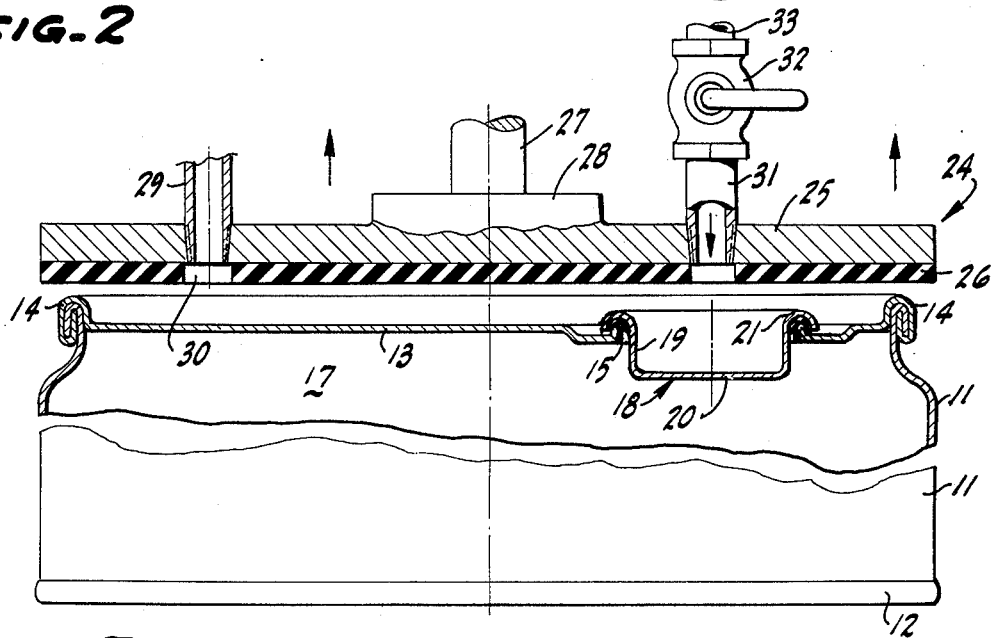
FIG. 3 is a broken vertical sectional view, partly in elevation, similar to FIG. 1 but differing therefrom in that the closure member is in sealing relation with the container.

Also illustrated in the drawing is a closure member 18 in the form of a cap adapted to removably cooperate with the opening 15 to maintain a pressure differential between the ambient environment and interior 17 of the container during a leakage-test period, as explained in detail hereinafter. The closure member 18 has a generally cylindrical sidewall 19 formed integrally with a bottom wall 20. Adjacent its upper end, the sidewall 19 of the closure member is curved outwardly and downwardly to provide a flange 21 of generally convex configuration defining a space within which is located a seal or gasket component 22 intended to cooperate with the rim 16 to establish a seal therewith, as shown in FIGS. 3 and 4.

Figure 4:
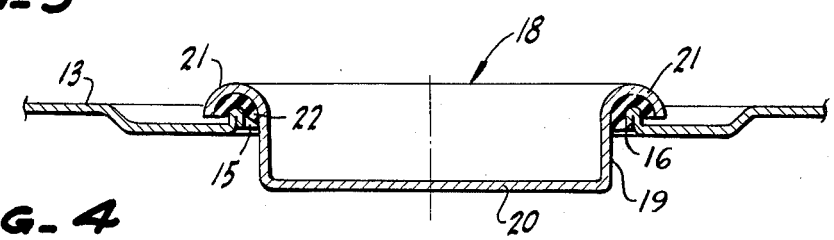
FIG. 4 is an enlarged, broken vertical sectional view illustrating the cooperative interconnection of the closure member and container as shown in FIG. 3.

As is most evident in FIG. 4, the outer diameter of the sidewall 19 of the cap 18 is substantially less than the inner diameter of the rim 16 defining the container opening 15 so that as respects the coaxial circumjacent relationship of the rim 16 with the closure member 18, there is a very loose fit therebetween so that the closure member is readily and freely placed within the opening 15 and removed therefrom with essentially no frictional inhibition or other obstruction to such placement and removal of the closure member. The closure member 18 is also a relatively stiff or rigid member so as to resist bending or other deformation that otherwise might be enforced thereon as a consequence of any pressure differential across the bottom wall 20 thereof and, by way of example, the closure member may be fabricated from 18 gauge steel of the type ordinarily used in making containers of the particular example being considered. By way of further example, the opening 15 may have a diameter of approximately 2-⅜ inches, and the outer diameter of the wall 19 of the closure member for such opening may be approximately 2-¼ inches. An opening of that size is typical in the particular insecticide pail under consideration in which the diameter of the sidewall 11 thereof is of the order of 11 inches.

The downwardly turned flange 21 of the closure member 18 is sufficiently large to completely overlie the rim 16 of the container, and referring to the specific example given, the outer diameter of the flange 21 may be approximately 2-15/16 inches. The depth of the flange 21 should be sufficient to enable the rim 16 to seat firmly into the gasket 22 so as to assure an hermetic seal therebetween, and again considering the specific example given, the outside depth of the flange may approximate 3/16 of an inch. The gasket or seal 22 should be sufficiently soft and pliable so as to conform to the rim 16 and thereby establish the desired relationship therebetween without permitting metal-to-metal contact between the rim and downwardly facing surface of the flange 21. A number of resilient, conforming-type materials may be used to attain the sealing relationship desired under the conditions subsequently explained, and a specific example of one such material is number 34212G Vacuum Seal Compound sold by Dewey and Almy Chemical Division of W. R. Grace and Co., of San Leandro, Calif.

Customarily, containers 10 are tin-coated or otherwise covered along the interior surfaces thereof with a material to protect the metal walls of the container from attack by the materials stored therewithin, but for purposes of simplification, such coating is not illustrated in the drawing and constitutes a standard technique in the container art. Analogously, the closure member 18 is protected as by means of a tin coating along the undersurfaces thereof to protect the same from contamination and especially from oxidation should it be exposed to moisture. Such coating is not illustrated for purposes of simplifying the illustration and is taken to be a part of the bottom and sidewall structure of the closure member 18.

In the method of testing the opening-equipped container 10 for leakage during the relatively long time period intermediate fabrication of the container by the manufacturer thereof and filling the container by the user with product intended therefor, a pressure differential is established between the interior and exterior of the container. Establishing such pressure differential may be effected by various techniques, and since the exterior pressure in most instances (although it need not necessarily be) will be that of the atmospheric environment, the pressure within the interior 17 of the container will be either subatmospheric or superatmospheric pressure. In the particular embodiment of the invention under consideration, the pressure within the container 10 will be a partial vacuum or subatmospheric pressure, and where a superatmospheric pressure is more desirably used, it will require an inverted counterpart of the closure member 18, as will be more apparent hereinafter.

Figure 2:
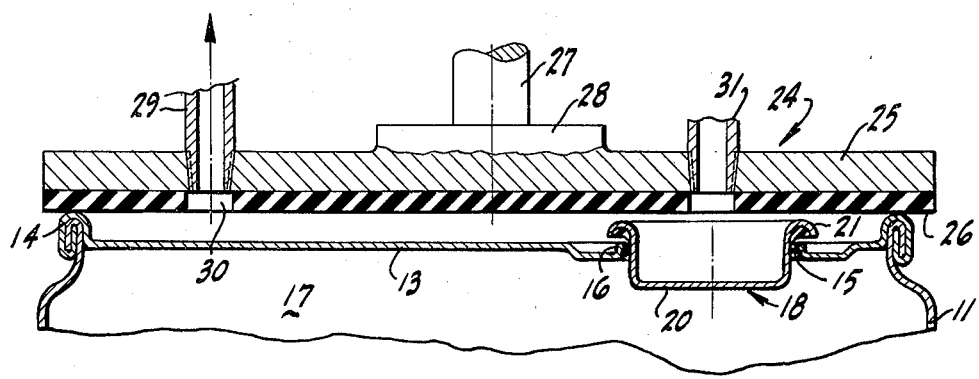
FIG. 2 is a broken vertical sectional view similar to that of FIG. 1 but illustrating the relative positions of the cap-equipped container and apparatus as the pressure differential is being established.

Establishing a pressure differential by creating a partial vacuum within the interior 17 of the container 10 may be effected in one of several ways such as by heating the container and sealing the opening 15 thereof prior to permitting the container to cool, or by means of a vacuum pump to remove air from the container and thereby reduce the pressure therewithin. This latter technique is illustrated in the drawing, and the apparatus for establishing such pressure differential is denoted in its entirety with the numeral 24. Such apparatus includes a relatively rigid backing plate or platen 25 which may be formed of a metal such as steel, and the platen along the undersurface thereof may be equipped with a resilient sealing pad 26, either synthetic or natural rubber or one of the many resilient synthetic plastic materials. As shown in the drawing, the pad 26 covers the entire undersurface of the platen 25, although complete coverage is not essential. The apparatus 24 further includes a reciprocable shaft or ram 27 fixedly connected to the platen 25 by means of an enlarged boss or mounting element 28 rigidly secured to each. The container 10 and apparatus 24 are adapted to be displaced in vertical directions relative to each other between the positions respectively shown in FIGS. 1 and 2, and in the particular arrangement illustrated, the apparatus 24 is taken to be vertically displaceable by means (not shown) provided for this purpose which may take any completely conventional form including any standard motor means such as a fluid energized piston-cylinder structure.

The apparatus 24 further includes a flow-conduit 29 mechanically connected with the platen 25 so as to be displaceable therewith and also being sealingly related thereto. The conduit 29 either extends completely through the platen 25 via an opening therein provided for this purpose, or the platen is otherwise equipped with an opening by means of which flow communication is established between the interior of the conduit 29 and the underside of the platen. The pad 26 has an aperture 30 in alignment with the conduit 29, thereby enabling the conduit to communicate for fluid-flow purposes with the underside of the pad. The conduit 29 adjacent its opposite end is connected to a vacuum pump (not shown) by means of which a reduced pressure is developed within the interior of the conduit and, therefore, within the interior of the container 10 in a manner subsequently described.

In use of the apparatus 24 and practice of the testing method, the container 10 is provided with a test closure 18 which, because of the loose fit described, will fall downwardly into the opening 15 until the seal 25 rests lightly upon the upper edge of the container rim 16. This condition is not specifically illustrated in FIG. 1 which depicts the closure member in an artifically elevated position to emphasize the step of inserting the closure member into the opening but suggests the downward movement of the closure member by the directional arrow associated therewith. The container 10 is then brought into functional association with the apparatus 24, and they are then brought into the positional relationship illustrated in FIG. 2 in which the pad 26 sealingly engages the rim 14 of the container. The vacuum pump is then energized (assuming the condition in which it was not previously in operation) to establish a reduced pressure within the conduit 29 and, therefore, within the space defined between the downwardly facing surface of the pad 26 and upwardly facing surface of the container top wall 13. Such reduced pressure tends to elevate the closure member 18 slightly, and air within the interior 17 of the container escapes through the opening 15 and is withdrawn via the conduit 29.

This condition is maintained until the pressure within the interior 17 of the container has reached some predetermined value which, by way of example, may be typically within the range of about 5 inches to 8 inches of mercury. Once a pressure equalization is established between the interior 17 of the container 10 and the space intermediate the container top wall 13 and pad 26, gravity tends to return the closure member 18 to its original position in which the seal 22 rests upon the upper edge of the container rim 16. The vacummized condition between the container top or end wall 13 and pad 26 of the apparatus 24 is then quickly relieved, and the sudden inrush of air and pressure differential thereby established across the closure member 18 seats the same firmly and positively against the rim 16 causing the latter to become embedded within the relatively soft seal 22, as shown in FIGS. 3 and 4.

The reduced-pressure condition in the space between the container wall 13 and pad 26 may be relieved in any convenient manner as, for example, by switching the conduit 29 from its vacuum connection to an atmospheric vent by conventional valve means or, as shown in the drawing, by venting the space directly to atmosphere via a conduit 31 communicating therewith through the platen 25 and pad 26, valve 32 which may be manually or mechanically manipulated, and vent tube 33. In any case, after the pressure differential has been established between the interior and exterior of the container 10, the closure member 18 is seated against the container in covering relation with the opening 15 thereof in sealingly relate the closure member and container, and thereafter the relationship is maintained using such pressure differential as the only means for this purpose. In the arrangement being considered, the closure member 18 is seated and sealingly related to the rim 16 entirely by the pressure differential although mechanical seating arrangements to press the closure member into sealing engagement with the rim 16 can be included.

Next, the sealed container 10 is transported to its place of use with the pressure differential being maintained unless, of course, the container leaks. Transporting the container from its place of manufacture to its place of use may involve widely disparate time periods depending upon any particular environment and the concept of transporting the containers is intended to include the actual storage time of the container after the pressure differential has been established both at the place of manufacture and at the place of use. In any event, the time period is relatively long and will usually extend from a few days to a few weeks although in certain instances it may be as short as a few hours or less or as long as several months.

In this reference, the usual commercial situation is one in which the manufacture of the container is not the user thereof, and containers of many types and styles, qualities and sizes may be fabricated on specific order from customers or on a regular basis going into inventory until orders therefor are received. The customer may be located in relatively close proximity to the container manufacturer or may be many hundreds of miles therefrom; and similarly the customer may order containers only as needed or may store the same on his premises so as to have a ready supply when required. However, the fabricator of containers might also be the user thereof in which event transportation of the sealed container could simply be from one location in a particular plant or facility to another location thereat either with or without intermediate storage. Thus, the time peroid involved in the pressure test would be short with reference to the long-distance transport and long-period storage condition noted, but would nevertheless be relatively long referenced to the very short test periods that characterize conventional production-testing techniques.

Following such transporting of the sealed container, irrespective of the period and/or distance thereof, the condition of the container is determined by testing the tightness of the closure member 18 against the container rim 16 using such tightness as an index of any loss of the pressure differential. That is to say, the closure member 18 is maintained in sealing engagement with the container rim 16 only in the presence of a sufficient pressure differential across the closure member or, otherwise stated, between the interior and exterior of the container. Accordingly, should such pressure diffential be lost, the closure member 18 will no longer be tightly seated upon the rim 16 in sealing engagement therewith but will be loose and free to fall therefrom.

Considering a very simple test for tightness, all that is required is for the container 10 to be inverted so that the top wall 13 thereof faces downwardly. If the closure member 18 remains in place, it is apparent that a pressure differential has been maintained between the interior and exterior of the container, and it may be assumed that the container is in good condition and does not leak and may be used with confidence. The satisfactory condition of the container may further be established by removal of the closure member 18, the resistance to removal and sound when the seal is broken further establishing the presence and magnitude of the pressure differential. On the other hand, if the pressure differential no longer exists because of leakage, the closure member 18 will fall from the opening 15 when the container is inverted. Under the various conditions heretofore described, such test may be made either by the manufacturer or the user, but it is evidentally advantageous to delay the test as long as practicable to maximize the test period and thereby enhance the accuracy of the test results.

The test closure member 18, as previously explained, is of special construction being sufficiently rigid to resist deformation under the pressure differential defined thereacross; and it also establishes a particular structural and functional relationship with the container 10 and rim-equipped opening 15 thereof. Once the leakage test has been completed and the closure member 18 removed, it may be discarded and replaced with a conventional closure member that will be sealing related to the rim 16 in the usual manner once the container has been filled with the product therefor. In the case of the pressure differential being developed because of a positive superatmospheric pressure being developed within the interior 17 of the container, the test closure member will take the form of an inverted counterpart of the member 18, having components thereof adapted to be pressed outwardly into sealingly engagement with the container. In the event of a positive internal pressure of such type, a pressure within the range of about 5 psig to 8 psig will generally be effective.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a method of testing opening-equipped containers for leakage during the relatively long time period intermediate fabrication of such container by the manufacturer therefor and filling the same by the user with the product intended therefor, comprising the steps of: establishing a pressure differential between the interior and exterior of such container; seating a closure member against such container, in covering relation with the opening thereof to sealingly relate the closure member and container using such pressure differential to maintain the sealing relationship therebetween, such that the closure member engages only the container; and thereafter testing the tightness of the closure member against the container as an index of any loss of such pressure differential.

2. The method of claim 1 in which the step of seating the closure member and maintaining the same in sealing relationship with the container is effected entirely by the pressure differential between the interior and exterior of the container.

3. The method of claim 1 in which the step of establishing a pressure differential between the interior and exterior of such container includes developing a subatmospheric pressure therewith.

4. The method of claim 3 in which air within the container is pumped therefrom to evacuate the same and develop a subatmospheric presence as aforesaid.

5. The method of claim 1 in which the step of testing the closure member for tightness includes attempting to remove the closure member by application of a limited force thereto.

6. The method of claim 5 in which the container is inverted to orient the closure member downwardly, whereby the limited force applied thereagainst is gravitionally derived.

7. The method of claim 1 including the further step of providing a closure member dimensioned to fit loosely within the container opening and overlie the external marginal edge portions thereof, in which said closure member is seated within the opening, and in which the step of establishing a pressure differential between the interior and exterior of such container includes reducing the pressure within the container to a subatmospheric value.

8. The method of claim 7 in which the step of seating the closure member and maintaining the same in sealing relationship with the container is effected entirely by the pressure differential between the interior and exterior of the container.

9. The method of claim 8 in which air within the container is pumped therefrom to evacuate the same as aforesaid, and in which the step of testing the closure member for tightness includes attempting to remove the closure member by application of a limited force thereto.

10. The method of claim 9 including the further step of transporting the sealed container from its place of sealing to its place of use prior to testing the tightness of the closure member.

11. The method of claim 1 including the further step of transporting the sealed container from its place of sealing to its place of use prior to testing the tightness of the closure member.

12. In a method of testing opening-equipped containers for leakage during the relatively long time period intermediate fabrication of such container by the manufacturer thereof and filling the same by the user with the product intended therefor, the steps of: establishing a pressure differential between the interior and exterior of such container at its place of manufacture; closing such opening with a closure member to maintain the pressure differential; transporting the sealed container including said closure member from its place of manufacture to its place of use with such pressure differential being maintained; and thereafter testing the container at its place of use for any loss of such pressure differential.

13. In a method of reducing the pressure within a container having an opening in a lip-equipped wall thereof and of sealingly seating a closure member against such container in covering relation with the opening therein to maintain thereafter the reduced interior container pressure comprising the steps of: placing the cover member in overlying relation with the opening such that the uppermost portion of such cover member lies below the uppermost part of the lip; closing the space bounded by such lip and the wall which communicates through said opening with the interior of the container; reducing the pressure within such space and container interior to a subatmospheric value; seating such closure member against the container in overlying relation with the opening; and increasing the pressure within such space relatively rapidly to establish a pressure differential across the closure member effective to sealingly seat the same against the container.

* * * * *

UNITED STATES PATENT OFFICE
CERTIFICATE OF CORRECTION

Patent No. 3,930,401           Dated January 6, 1976

Inventor(s) Harry H. Filler

It is certified that error appears in the above-identified patent and that said Letters Patent are hereby corrected as shown below:

On Cover Sheet:

[73] Assignee: should read -- Rheem Manufacturing Company --.

Signed and Sealed this first Day of June 1976

[SEAL]

Attest:

RUTH C. MASON
*Attesting Officer*

C. MARSHALL DANN
*Commissioner of Patents and Trademarks*